(12) United States Patent
Genin

(10) Patent No.: US 6,628,510 B2
(45) Date of Patent: Sep. 30, 2003

(54) METHOD AND APPARATUS FOR COMPUTER INTEGRAL WITH WALL

(75) Inventor: Alexander Genin, Houston, TX (US)

(73) Assignee: First Capital International, Inc., Houston, TX (US)

( * ) Notice: Subject to any disclaimer, the term of this patent is extended or adjusted under 35 U.S.C. 154(b) by 27 days.

(21) Appl. No.: 09/947,725

(22) Filed: Sep. 6, 2001

(65) Prior Publication Data
US 2003/0045227 A1 Mar. 6, 2003

(51) Int. Cl.7 .................................................. H05K 5/00
(52) U.S. Cl. ...................... 361/681; 312/223.2; 361/687
(58) Field of Search ................................. 361/687, 681, 361/683, 688, 724; 312/223.2, 223.3; 454/237, 251, 252, 253, 364, 184

(56) References Cited

U.S. PATENT DOCUMENTS 5,021,763 A * 6/1991 Obear .................... 340/407.2
6,246,573 B1 * 6/2001 Khan et al. .................. 361/683
6,307,739 B1 10/2001 Leman
6,477,039 B2 * 11/2002 Tajima ........................ 361/681
2002/0109969 A1 * 8/2002 Wellhofer .................... 361/687

FOREIGN PATENT DOCUMENTS

| EP | 0 565 366 | * 10/1993 |
| JP | 2-277424 | * 11/1990 |
| JP | 2-285160 | * 11/1990 |

* cited by examiner

Primary Examiner—Harold Joyce
(74) Attorney, Agent, or Firm—Wong, Cabello, Lutsch, Rutherford & Brucculeri, L.L.P.

(57) ABSTRACT

A computing system is proposed for installation or retrofit in homes or offices. The system easily installs in wall structures without concern for interference with load bearing structures. In its varying embodiments the system provides for audio or video entertainment, security, remote monitoring, and all forms of communications and networking with other computing systems and appliances. The system exploits a menu-driven graphical user interface, a rigid framing mechanism and special ventilation techniques to achieve an unprecedented computing system for integral incorporation within a home and office.

21 Claims, 8 Drawing Sheets

METHOD AND APPARATUS FOR COMPUTER INTEGRAL WITH WALL

BACKGROUND OF INVENTION

1. Field of the Invention

The invention relates to the area of computing as it occurs in home and office convenience and automation. More specifically, the invention relates to a computing system that has a set of core functional components in a form factor that allows for easy installation in a wall or other structure like a wall. The invention further relates to the area of user-friendly computing involving intuitive physical user interfaces and menu driven graphical user interface.

2. Description of the Related Art

In recent years there have been substantial advancements in the area of computing, which have created a tremendous incentive for users to adopt a computing lifestyle. The Internet and the ubiquity of networking has collapsed communication barriers and provided a meeting place and communication medium for those with common interests around the world. It has also created the deepest most content-rich information store ever known to man. In addition, the cost of adopting the computing lifestyle have never been less and by many estimates has created wide access opportunities for those with modest incomes or more. These advancements have benefited a multitude of businesses and individual users in many different ways. However, there have also been many left behind. They are left behind due to a variety of reasons, including apprehension about advanced technology and a general discomfort with the notion of approaching computing and the included tasks. Many times, they are left behind simply because computers and computing, despite the relative ease to many, are utterly unapproachable for some.

Computer makers have attempted to address these discomfort and approachability issues over time. Early client computers came in the form of relatively large and heavy metal boxes with a variety of proprietary ports and connectors. As the industry evolved the forms became sleeker more attractive. In addition, the ports and connections became standardized. Currently, a variety of form factors are available from large desktop computers to the smallest palm-top computer. Some computers even come in packages that disguise their identity.

As form factor and ease-of-use has evolved, so too has the variety of options for places to use computers. For example, computing is now commonly done in the home, on airplanes, by the pool, in cabs and virtually any other place that daily activity takes a businessperson or personal user. In addition, an entire furniture industry has evolved around computing, spurring specially crafted desks, armoires and tables. Business has also placed computers in a variety of appliances and devices, such as ATM machines, home appliances, and security or surveillance equipment.

SUMMARY OF INVENTION

The various embodiments of the current invention propose to mitigate the problems of the prior art by proposing a user-friendly and approachable computing system that may exist in a home or office in a non-obtrusive and aesthetically sensitive manner. In that regard, it is an object of the invention to provide computing system that is easy to approach and non-intimidating to users. Embodiments of the invention achieve this object by providing a computing system that incorporates into the structure of a wall and provides a menu driven graphical interface with a touch-screen and voice recognition physical interface.

It is a further object of the current invention to provide an easy-to-install computing system for incorporation into the structure of a home or building. The invention achieves this object by providing a computing system having sufficient integration, structural rigidity and ventilation options for simple construction or retrofit into a home or office wall.

Embodiments of the current invention aggregate the components of the system, often including a display, into a frame mechanism that is rigid enough for load-bearing duty in a wall. The computing system is installed with any desired peripheral and a ventilation system to move air through and cool or clean components. Embodiments of the system use a cover for protection and aesthetics; however, the cover generally provides visibility and access to the display. Other embodiments also may include access to various peripherals and connectivity options. Finally, yet other embodiments of the invention include a web site to facilitate easy communication with the system from anywhere in the world.

BRIEF DESCRIPTION OF DRAWINGS

A better understanding of the invention can be had when the following detailed description of the preferred embodiments is considered in conjunction with the following drawings, in which.

DETAILED DESCRIPTION

Figure 1:
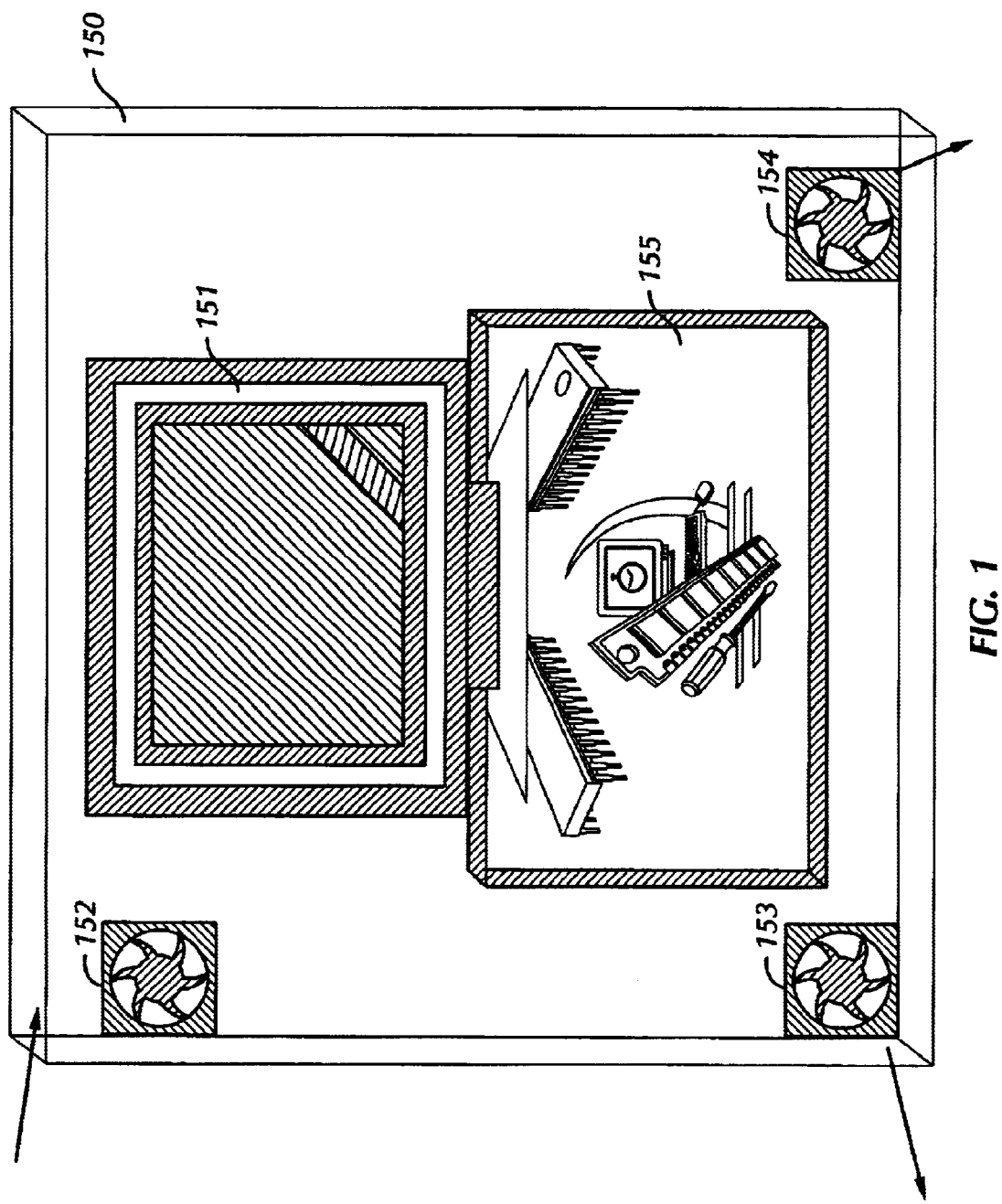
FIG. 1 shows a generic version of a computing system in a frame.

A very general implementation of the invention is shown in FIG. 1. Frame 150 is a five-sided frame in the shape of a box. A purpose of frame 150 is to provide a container for computer assembly 155, screen 151, fans 152, 153 and 154, and any desirable computer peripherals. Frame 150 is shown as a rectangular form with depth (like a box) although any form may be acceptable in varying embodiments. For example, frame 150 could take nearly any geometric shape like a circle, square, triangle, trapezoid etc, that will provide adequate structure or enclosure for the purpose of maintaining the positions of the system components as necessary for implementation. Furthermore, since frame 150 has a primary purpose of maintaining the arrangement of components, some embodiments of the invention will use a "frame" comprising a rod, cable or combination of items that perform any or all of the following functions of frame 150: containing system components, protecting system components, providing structure or placement for system components, and providing a carriage mechanism for system components.

Referring again to FIG. 1, screen 151 may be any display mechanism suitable for use with a computer. Various embodiments of the current invention call for flat screen displays such as silicon based screens (like LCD's) or plasma-based screens. Alternatively, screen 151 may be a CRT, LED or any display device. While an obvious purpose of screen 151 is to display computer output, the invention also contemplates that the screen can be a "touch" screen and thereby function as a pointing device and physical interface to the computing assembly 155 and any attached network. Lastly, display 151 may function as a television or as a display in an entertainment system.

Connected with screen 151 is computing assembly 155. Computing assembly 155 generally houses the core computing components such as disks, memory, microprocessor, system chip set, graphics controller, bios, and power supply. In the modern era, most of these components are affixed to a common medium called the motherboard. While typical implementations of computing assembly 155 will contain personal computer-like components, the invention contemplates that of the system components may be physically located where necessary, appropriate or desirable. For example, the components normally found within computing assembly 155 may be mounted anywhere within frame 150 (like fans 152, 153 and 154) and may or may not have a dedicated enclosure. Alternatively, in another example, fans 152, 153 and 154 and other components can be contained within an enclosure comprising computer assembly 155.

While not strictly necessary, many embodiments of the invention allow for the computing components to be fully housed so that they may be protected from dust and debris. This can be accomplished in any reasonable fashion, but most commonly either by (i) putting on cover on the frame 150 essentially creating a six-sided box with an opening for the display, (ii) by containing all sensitive components within an enclosure comprising computing assembly 155.

Referring again to FIG. 1, fans 152, 153 and 154 are arranged to force air through frame 150 for the purpose of cooling the electrical component that may require cooling. In the shown embodiment, fan 152 forces air into the frame 150 and fans 153 and 154 force air out. The arrangement of having one fan drawing air in and two fans pushing air out in the shown configuration causes cross airflow and turbulence to ensure cooling across the interior of the frame 151. In the art of computer cooling there are many techniques that may apply to this invention and those techniques are well known in the art.

Figure 2:
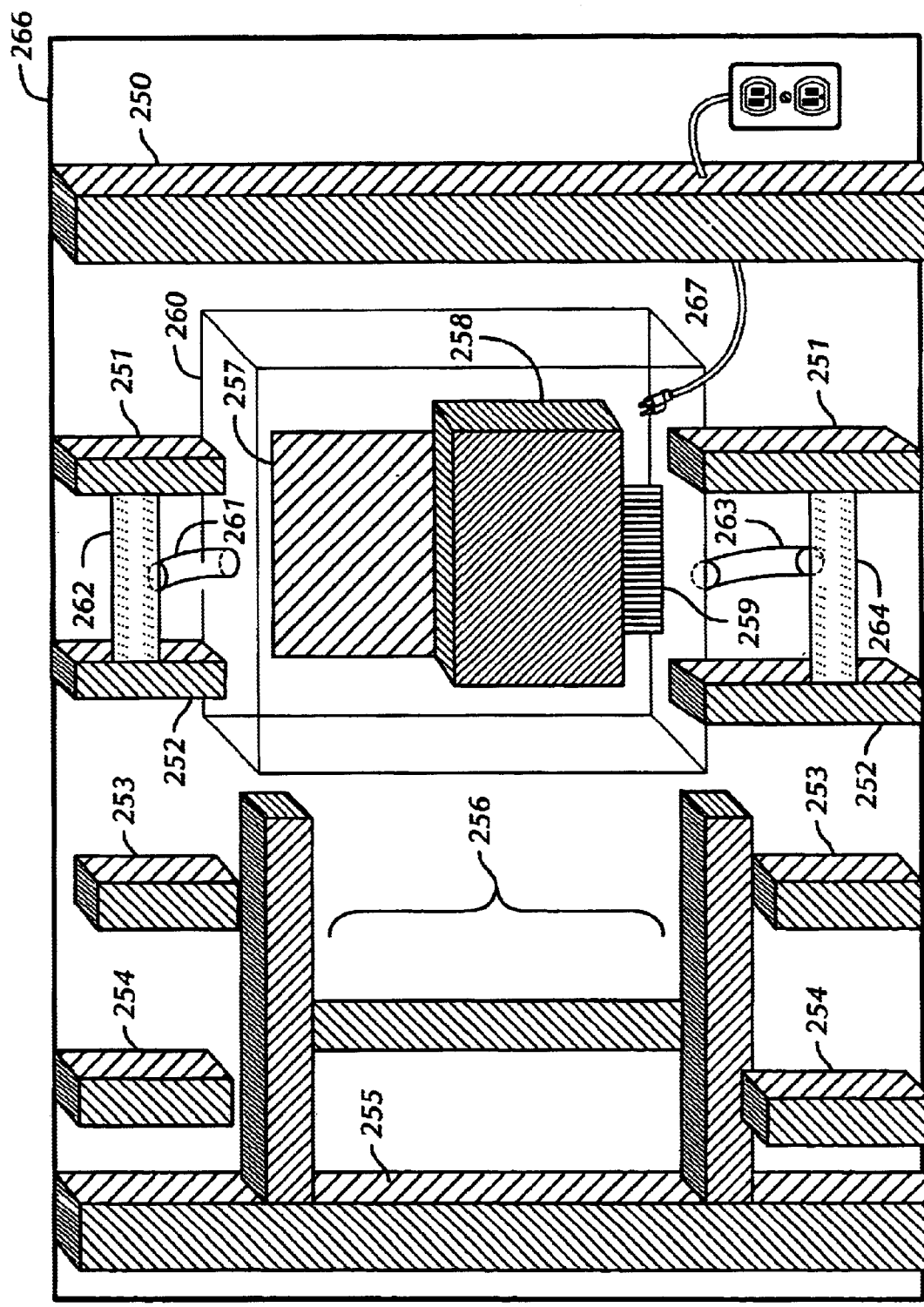
FIG. 2 shows an open wall containing a populated box frame and an unpopulated version of a variant type of frame.

Referring now to FIG. 2, a computer apparatus similar to that represented in FIG. 1 is shown inserted in an open wall (having no sheet rock or other covering). One embodiment of the invention contemplates that Frame 260 and its contents are inserted into an opening cut in the wall 266 after the wall is constructed. Referring to FIG. 2, vertical studs 251 and 252 have been cut to make room for the insertion of the apparatus. FIG. 2 also shows an I-frame 256 inserted in a cutout of vertical studs 253 and 254. I-frame 256 illustrates how the computing apparatus might be mounted if not in a rectangular box frame like frame 260. The larger point demonstrated by I-frame 256 is that the invention contemplates that the components in box frame 260 may otherwise be fixed in the wall 266 using an alternative type frame and in any reasonable way that meets the objects of the invention. For example, some embodiments of the invention are supported by different load-supporting structures such as I-frame 256. Other embodiments of the invention are small enough (or shaped adequately) not to require cutting of reasonably spaced studs. These smaller implementations may be affixed to adjoining studs, the sheet rock or the wall structure behind the studs with any reasonable and well-known carpentry and bracketing hardware and techniques.

Referring again to FIG. 2, Frame 260 sits inside the wall 266 inserted in cutouts of vertical studs 251 and 252. In some embodiments of the invention the frame 260 combined with its contents must be rigid and sturdy enough to provide load bearing support necessary to compensate for any studs or other load bearing members that are altered due to installation of the apparatus. This sturdiness may be achieved by using a high strength material such as steal, aluminum or high-strength plastics [ALEX, WHAT MATERIAL DO YOU USE?] This sturdiness may also be achieved by using a combination of materials and shape, for example, arching the upper side of frame 260 should relax the material strength requirement for a similar load. The ability to sustain load greatly reduces the burden of installing the apparatus because an installer may select the installation site against a covered wall without regard to the location of studs. Of course, this also ultimately leads to the most aesthetically desired result because the unit may be placed anywhere that power is accessible.

In determining how much load the frame must bear, there must be consideration of: (i) how many studs or load-bearing members may be affected by the installation; (ii) the size of the system to be installed; and (iii) how much load each member would bear. For example, if the frame is 30 inches wide and will be installed in a home having studs on 16 inch centers, then the frame need support no more than two times the load of a single stud (that is because there is no common place to put the system where it is likely to intersect more than 2 studs). Given the relatively low price of strong materials, some embodiments of the invention will include frames that can bear over 10 times the load of a single stud or load-bearing member. This will allow for more flexibility in installation where heavier loads may be encountered such as near doors or windows.

Looking within frame 260, screen 257 is shown atop and computing assembly 258, which is shown are shown atop connector 259. A more condensed apparatus could be formed by placing screen 257 in front of computing assembly 258. In the shown embodiment, computing assembly 258 is a modular design that connects into frame 260 via connector 259. The connection through connector 259 will facilitate connection to the monitor and any other peripheral device much the same way that a way that a docking station or port replicator facilitates connection for a laptop or notebook computer. This allows easy access to the core computing components for service, upgrade or even replacement. Of course, the same modular concept applies without the single connector concept. Specifically, a computing assembly 258 could be inserted in frame 260 in modular form and connected with monitor 257 and other peripherals using the standard and typical cables and connectors that computers, monitors and peripherals use. In addition to the modularity of computing assembly 258, the invention allows for a modular screen 257. Like the modular computing assembly 258, a modular screen may connect to the system via its normal power and signal connectors or via a single special connection carrying signals and power. Of course, the entirety of the system may be essentially integrally connected so that there would be little or no modularity.

Referring again to FIG. 2, vents 262 and 264 are shown. Vents 262 and 264 can be any mechanism that facilitates passage of air through itself. Some embodiments of the invention use louvered plastic or metal vents, perforated vents or simply perforations in the sheetrock or other wall covering. Vents 262 and 264 are each connected on one side with ventilation shafts 261 and 263 (respectively). The ventilation shafts are also connected to box frame 260 and provide a conduit from the box frame 260 to the vents. These ventilation shafts allow for the passage of air while limiting the amount of dust or debris that may enter or exit the system. Ventilation shafts may comprise any substantially clean conduit type device. Certain embodiments of the invention use washing machine or dryer vent hose, or tubes made of plastic, metal or rubber. Cumulatively, these components allow for clean airflow through the system for cooling or other purposes for which airflow may function (such as cleaning).

In many embodiments of the invention, air enters into vent 262 then moves into box frame 260 via ventilation shaft 261. The air passes through box frame 260 cooling or cleaning its contents and then passes out of box frame 260 and eventually out of vent 264 via ventilation shaft 263. Of course, the concepts are the same and the invention contemplates that the air may flow in the opposite direction (in vent 264 and out vent 262). As indicated earlier, the invention contemplates that airflow is aided by fans or other systems that induce or force the movement of air. In a typical embodiment two fans will force air out box frame 260 and one fan will force air in. However, the number and location of fans should be determined by the airflow requirements.

In connection with the airflow mechanisms, some embodiments of the invention contemplate the use of filters. Filters are typically located near the air intake because in that location they prevent dust, debris or contaminants from entering any part of the system. Filters, however, may effectively be deployed at any point in the airflow although it is preferable to filter air before it reaches box frame 260. A primary purpose is to keep dust, debris or contaminants away from the functioning components of the computing system. In the embodiment shown in FIG. 2, typical places to deploy filters are indicated by pointers 265. As between the locations indicated as 265, one may choose where to place the filter based upon whether it is desirable to change the filter at the site of the vent 264 or at the site of the box frame 260. Differing embodiments of the invention may include filters of varying type and quality. Typical filters comprise, polyester, foam, paper or any material, which allows air to pass while blocking or trapping dust, debris or contaminants.

Referring again to FIG. 2, power supply 267 is shown branched off of a normal wall outlet. Most embodiments of the invention do not require specialized power needs so a simple branch may be taken from a nearby lighting fixture, wall plug or other normal household or office electrical feature. Of course, this assumes that the resident wiring and circuit breakers can facilitate the extra load. If not, the outlet, light or other feature may be changed or removed to create the capacity to support the computing system and it's peripherals. Furthermore, since some embodiments may use several devices such as peripherals requiring extra power, some embodiments have a very large power supply for computing assembly 258 and the availability of a power strip within or around box frame 260. Furthermore, the power provisions may also include surge and spike protection for the power source as well as the other exterior connections such as a phone line or network connection.

Figure 3:
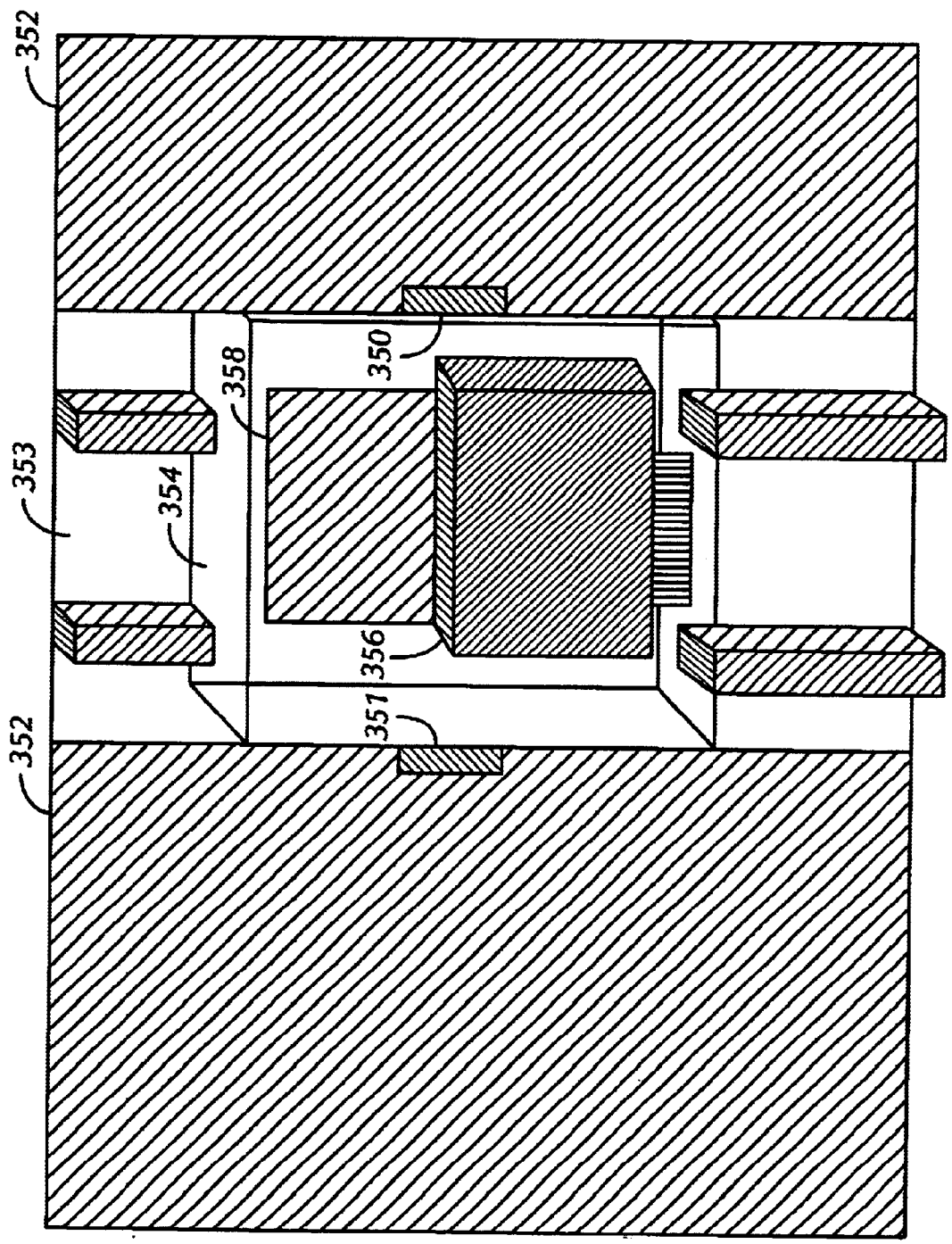
FIG. 3 shows a partially open wall having cover attachment points and containing a populated box frame.

Referring now to FIG. 3, box frame 354 is seen containing screen 353, computing assembly 356 and could, of course, contain any other components necessary or desirable for the function of the system. Here, the system is shown with the contrast of covered walls 352 and open wall 353, wherein studs are cut for installation of the system. Adhesion points 350 and 351 are shown to illustrate connection points for a cover. These adhesion points may be on covered wall 352 or open wall 353 (for example on the studs or box frame).

Figure 4:
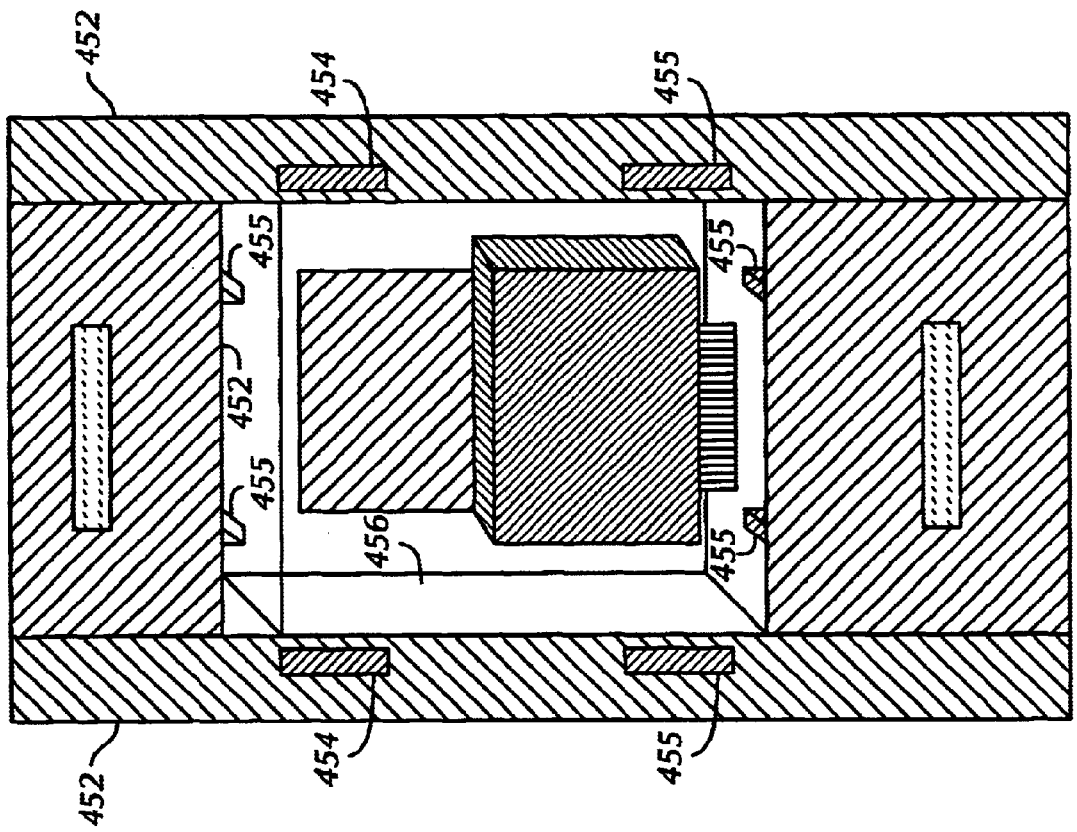
FIG. 4 shows a substantially closed wall installation of a populated box frame and an embodiment of a cover.
Figure 4:
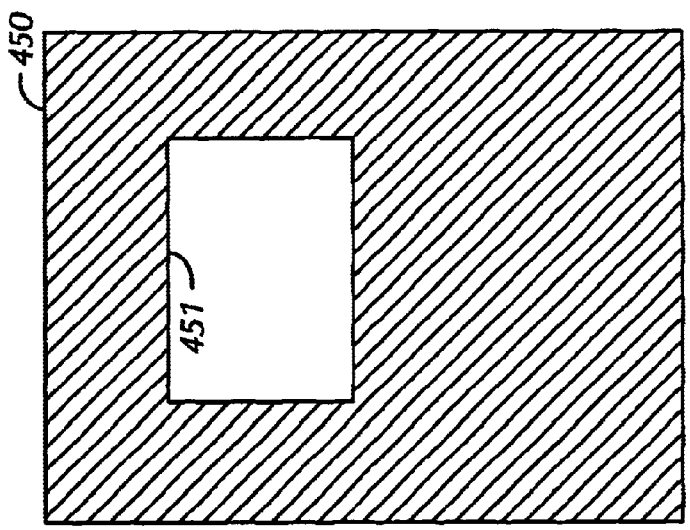

Referring now to FIG. 4, a typical generic embodiment is shown installed. Box frame 456 along with all its contents has been placed in a cut out in the wall 452. In this case the cut out included portions of sheet rock (or other wall covering) 452 as well as studs 455. As shown in FIG. 4, the cut outs may be limited to the approximate size of box frame 456. Therefore, using the measurements of the box frame, the installer may simply cut a hole in the wall and any interfering studs and then insert the box frame. Depending upon the location of studs, simple carpentry hardware (brackets etc.) and techniques may be applied to hold the box-frame in place. If ventilation will be used, the ventilation shafts may be most easily installed before the box frame is inserted. In that regard, vents 453 may be installed in measured cutouts and a flexible ventilation shaft (like washing machine vent hose) may be affixed to the vents 453 and the box frame 456 just before the box frame 456 is inserted.

FIG. 4 also shows cover 450 that is used to cover all elements of the system except that there is provision for viewing the screen. The invention contemplates, that the cover may be in one or more pieces and comprises any combination of plastics, metals, composites, woods, sheet-rock or any other materials that may be mounted to the wall. Since the cover functions both for protection and esthetics, the choice of materials will vary the cover's effectiveness for one or both of these functions. For example, a cloth cover will offer limited protection, but may be a perfect aesthetic match for a cloth-covered wall. Alternatively, an aluminum cover may offer outstanding protection, but may have little aesthetic desirability in the respective room. The cover may also comprise a functional combination of materials. For example, cover 450 may consist of a main plastic frame, and an anti-glare film covering screen-opening 451. The cover 450 may also have openings for ventilation or audio travel. For example, there may be holes or perforations that can be used for ventilation or audio travel with or without the combination of fabrics or other materials for protection, filtration or aesthetics.

Referring again to FIG. 4, adhesion points 454 are shown on the wall 452 essentially surrounding the system. In one embodiment these adhesion points are Velcro (or hook and loop connectors). In that embodiment, complementary Velcro would be found on the inside of cover 450 in spaces corresponding with adhesion points 454. Adhesion points may comprise any number of common options for affixing the cover over the box frame 456. Some examples are as follows: tape or adhesives; hinges, hooks, picture-type hangers, nails, bolts etc. Moreover, the number and location of the adhesion points 454 will be dictated by the type of adhesion point, for example a single hook on top or two hinges on a side may suffice. Furthermore, in some embodiments, the cover may be affixed to adhesion points within box frame 456. In some embodiments, the cover may be designed to hang from or affix to protrusions from within box frame 456. These protrusions may be specifically included for the purpose of adhesion or naturally occurring in the system. For example, the cover may hang from or affix to a slightly protruding screen. Alternatively, protrusions from the back of the cover 450 may affix to recessed portions within the box frame 456. Like the protrusions in the box frame, these recessed portions may be specifically included for adhesion or naturally occurring.

Figure 5:
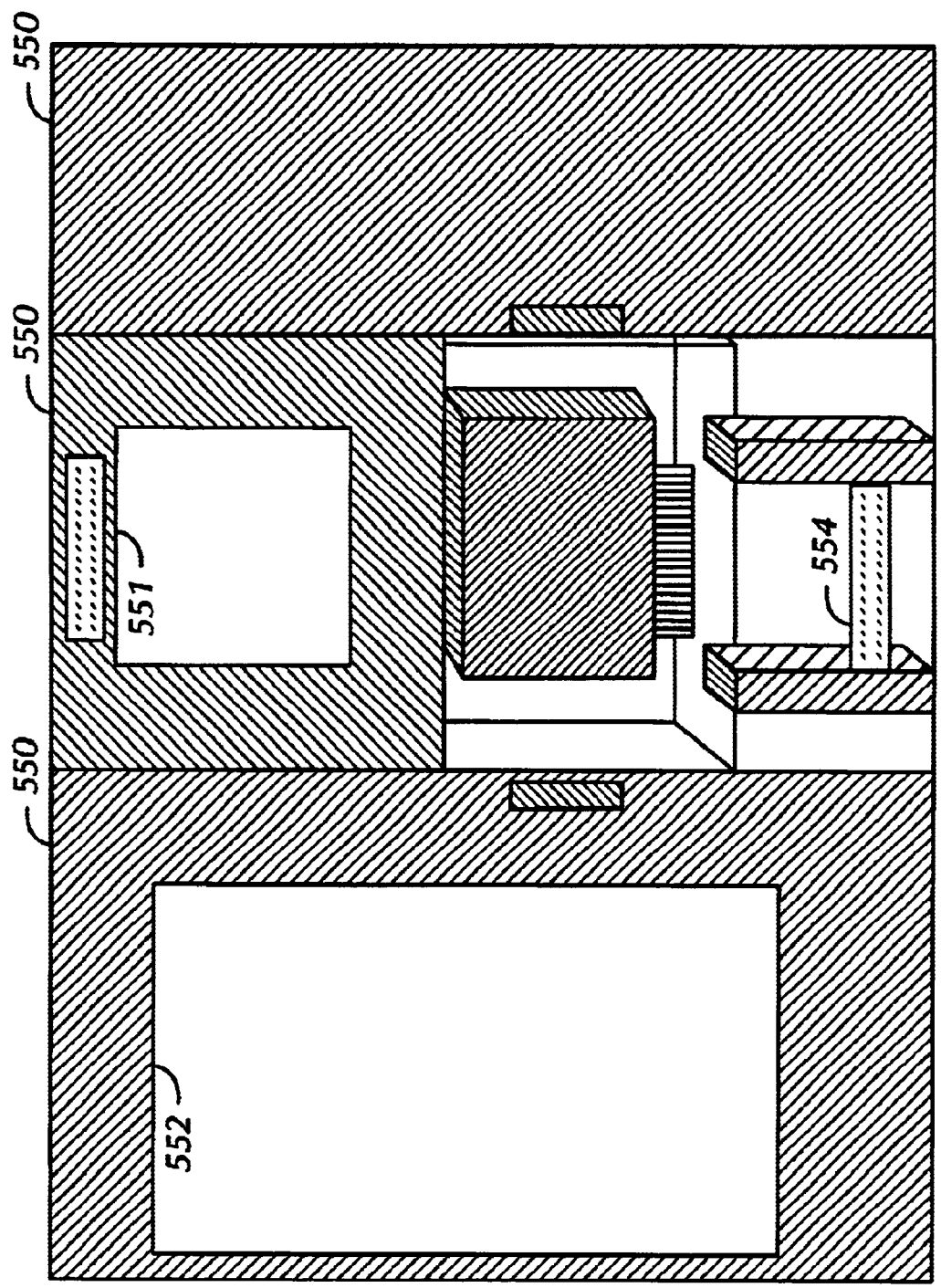
FIG. 5 shows a multi-screen and potentially multi-frame implementation in a partially open wall.

Referring now to FIG. 5, the illustration demonstrates that invention allows for two or more displays to be associated with computing assembly 555. In this embodiment, screens 551 and 552 are coupled to computing assembly 555 by either wired or wireless connections. Furthermore, unlike many of the foregoing embodiments, screen 551 needn't be integral with box frame 556. In that regard, the invention allows for separate frames housing the screen and the computing assembly 556. This type of embodiment would allow for separate installation of the screen and the computing assembly. This embodiment has advantages in that it allows for upgrade or replacement of a display assembly (the screen plus its box frame) separate from the box frame containing the computing assembly. In a two box frame arrangement, ventilation can be accomplished similarly by moving the air in either direction, through vent 553, through both frame boxes, and through vent 554. For airflow purposes, the two box frames may be connected by a ventilation shaft or by aligning an opening in one box frame with an opening in the other box frame and coupling the two frames together. The multiple box frame arrangement does not change the covering concepts materially, although, these embodiments lend themselves more logically to two or more covers.

Figure 6:
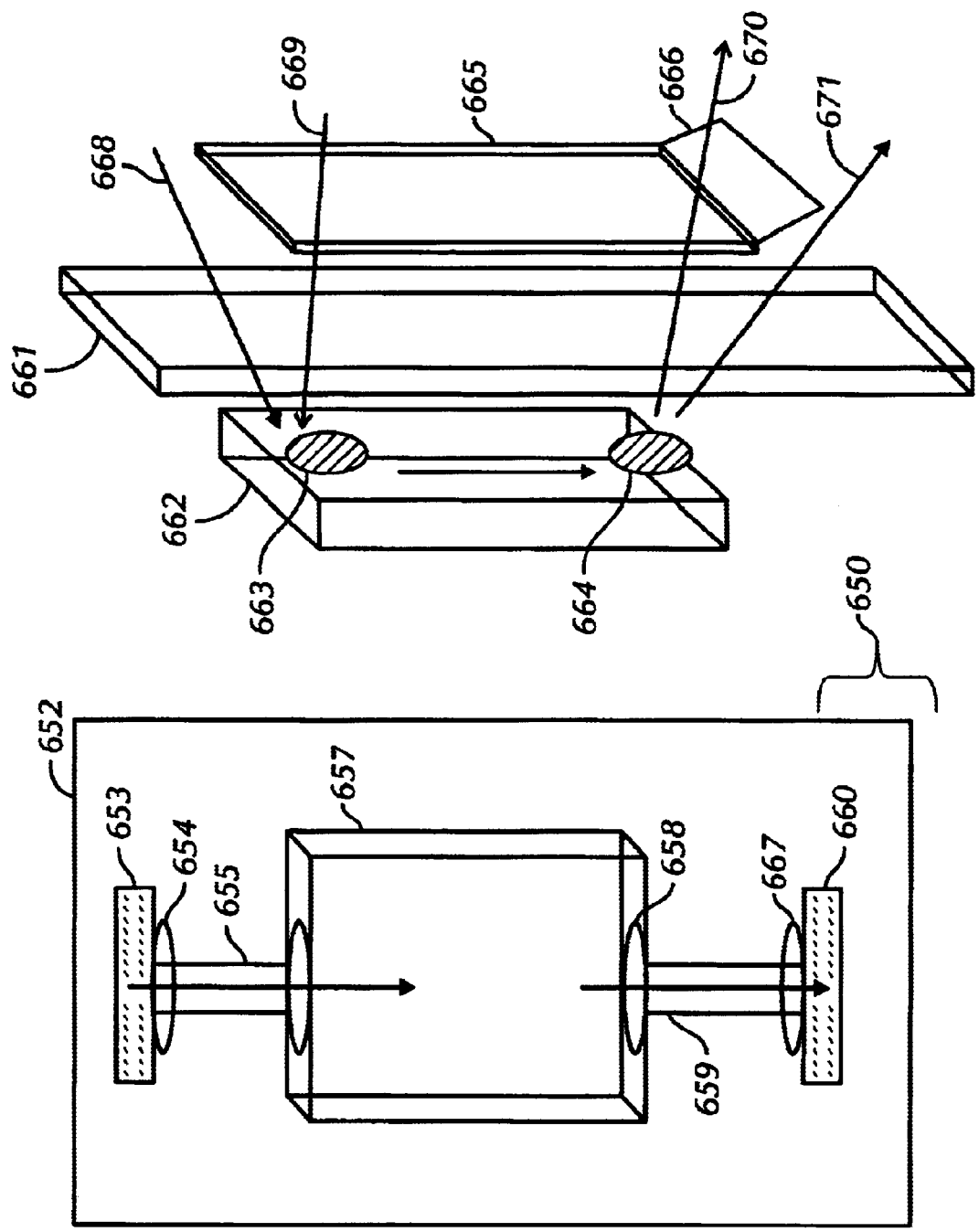
FIG. 6 shows ventilation options for systems of the invention.

Referring now to FIG. 6, a closer view of ventilation techniques is shown. The configuration and embodiment 650 shows air flow entering vent 653, passing through ventilation shaft 655 into box frame 657 and then out again through ventilation shaft 659 and vent 660. Of course, the flow may go in the other direction and is aided by using fans or other device to induce airflow. Locations 654, 656, 658 and 667 are all places where filters may be used. A filter at locations 654 or 667 would be changed by access at the vents. Filters located at 658 or 656 may be replaced or removed using only access to box frame 657, generally by removing a cover from the system.

Referring again to FIG. 6, the configuration and embodiment 651 shows an exploded profile view to demonstrate differing ventilation schemes. If not exploded, box frame 662 would be generally embedded in wall 661 and cover 665 would conceal the contents of box frame 662 while allowing view of the display. In order to cool or clean the system, air must traverse the cover 665, and after it does that, it will go in one side box frame 662 and exit out the other side (or some other place on box frame 662 that allows for adequate air flow through the box).

There are several ways that the air may traverse cover 665. Airflow 668 shows a path for air to move around the cover or through a small opening between the cover 665 and the wall 661. Airflow 671 demonstrates that air flowing around the cover may be further facilitated by flaring one or more sides of cover 665 such as flared portion 666. Air flows 669 and 670 demonstrate that air may flow through the cover if the cover (i) is made from an air-permeable material, (ii) has a opening for air flow, whether or not the opening is covered with an air permeable material, or (iii) the cover is perforated (e.g. slotted) to allow airflow. Since configuration and embodiment 651 demonstrates moving air relative to the cover, there are no wall vents involved. Furthermore, locations 663 and 664 illustrate preferred filter locations for certain embodiments of the invention.

With respect to the air movement discussions herein, the invention allows for any combination of techniques. For example, air may enter through or around the cover (for easier filter design and access) and exit through a vent to adequately separate waste air from incoming air.

Figure 7:
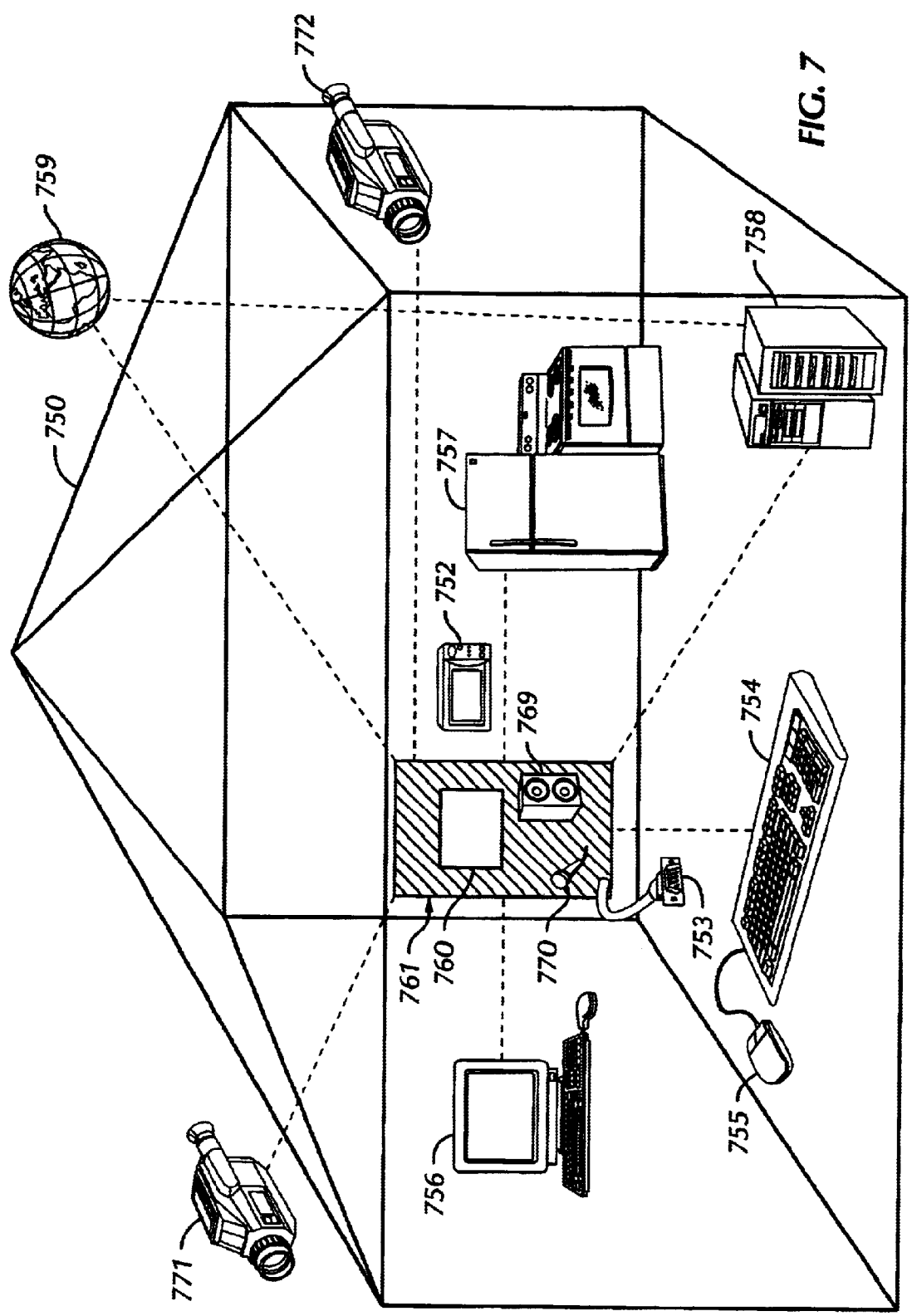
FIG. 7 shows a home or office installation of a system of the invention.

Referring now to FIG. 7, the invention is demonstrated within the context of the total computing environment such as the home or office 750. Box frame 761 is installed in the wall and concealed (except for screen 760) behind cover 751. At a very high level, this figure demonstrates some of the many interconnection and communication possibilities brought to bear by the invention, which functions as a computing appliance in the embodiment shown. The system is made extremely simple by adding touch-screen physical interface and a menu driven graphical user interface to control the systems functions. Further ease is achieved by using voice recognition and synthesis for communication with the system.

Referring again to FIG. 7, more specific attributes are also demonstrated. Connector 753 illustrates that certain embodiments of the invention will facilitate direct physical connection with the computing system behind cover 751. For example, appropriate perforations or openings may allow access to different types of disk drives (e.g. magnetic or optical), or connections (e.g. serial, parallel, USB, 1394, mouse, keyboard, video). FIG. 7 also shows speaker 752 which may be connected to the system with or without wires. One or more speakers may complement the system located behind the wall or cover, or on the outside of the wall or cover. In addition, FIG. 7 shows built-in video camera 769 and built in microphone 770, which easily enable recording audio, video or snapshots for use with system. For example, audio, video and snapshots may be used in connection with email, phone calls, video conferencing or security monitoring of the room.

Some embodiments of the invention also feature cameras 772 or 771 for monitoring rooms in the interior of the home or building (like camera 772) as well as for monitoring spaces outside the home or building (like camera 771). Other embodiments also allow for a wireless keyboard 754 and/or wireless mouse 755, which require a wireless interface attached to the system's computing assembly (behind the cover or wall). Computing station 756 and 758 are shown to demonstrate that the system may use normal computing networking technology to be part of a home or office computer network. The invention allows for the systems connectivity to extend to anything that a computer can communicate with through various wired and wireless links that are well known in the art. For example, the system may connect with the household appliances 757, the internet 759, a security system, the air conditioning and heating systems, an outdoor watering system, a fire alert system, a pool or water effects such as fountains, audio and video equipment such as televisions and stereos, the indoor or outdoor lighting, or any other item in a home or office that may be controlled or assisted by a computer. These connectivity features also allow the system to be used for video conferencing or other audio/video communications (in conjunction with phone or internet access), or for intercom functions (in conjunction with other intercom equipment). Furthermore, some embodiments may also serve as an entertainment system in the home by employing capabilities to make the display a video monitor or TV and use the audio capabilities to play radio or pre-recorded audio.

Given the wide connectivity and control that many embodiments may have, the invention also allows for security to prevent unauthorized access to these controls or any functionality of the system. The security can be in the form of simple password access or can be sophisticated, such as finger print panels or retinal detectors.

Figure 8:
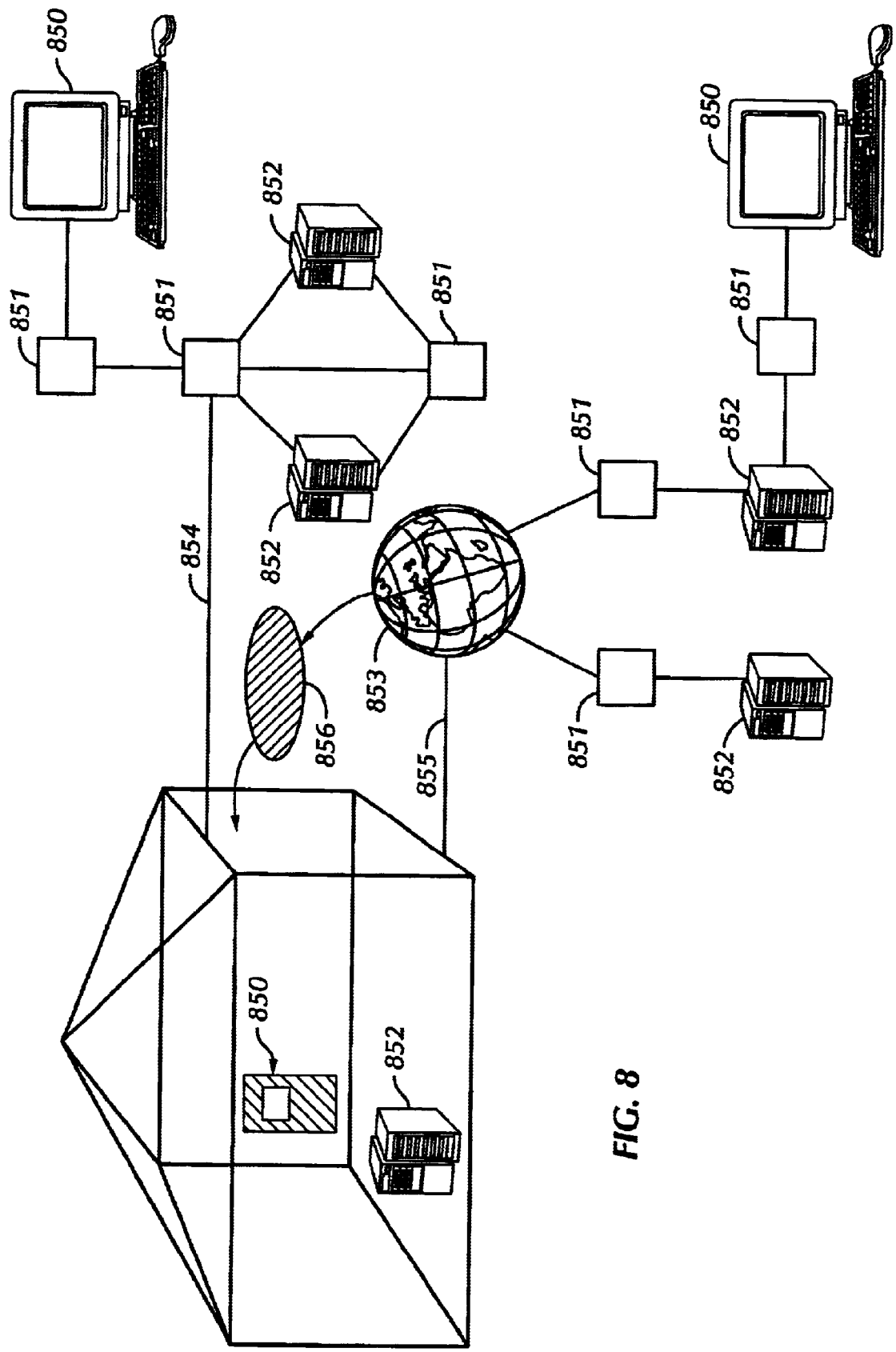
FIG. 8 shows a system of the invention in the greater network context.

Referring now to FIG. 8, the system is shown in the context of the larger network. During the past several years, many believe that the interconnection between computers (the "network") has become more prominent and important than the computing itself. For this reason, the invention shall be briefly explained within the context of the network. Referring to FIG. 8, an imaginary and typical network is shown including the Internet. User computers 850 connect to each other as well as other portions of the network through switching devices 851 such as hubs, routers, switches, bridges and other devices, which are commonly known in the area of networking. The network also includes servers 852 (many of which include mass storage devices such as disk drives) and the Internet 853. Other intelligent devices may attach to the network such as dedicated storage devices and virtually all forms of intelligent machines and appliances. All of these items are connected together by a series of information links including switching devices 851. Some links may use conductive wires and others may be wireless (using radio waves or light), or fiber optic (using light and light-carrying cable). Information is carried across the network in small pieces, typically called packets or frames. A system originating information will create packets, put an address on the packets and send them out over the network destined for the addressed system. Intermediary switching devices 851 or servers 852 or other intelligent devices may manipulate the packets. They may disassemble and reassemble the same or different packets, add or delete data and information or send original messages to the addressee or source. The packets containing the original information eventually propagate through the network and reach their destination.

In the context of the current invention, the invention serves as part or the entire computing infrastructure of a home or office. Connectivity outside the home or office may occur over dedicated or shared wire (such as connections 854 and 855) or over a wireless link such as link 856. The network allows communication to and from virtually anywhere. In varying embodiments of the invention, resources outside the home or office will be controlled from the home or office, or vise-versa. For example, a user may view his home from anywhere in the world through the system by accessing attached security camera. In addition, all the other functionality discussed may be similarly accessed.

In communicating between the home or office and any outside resource, the invention allows for use of a proprietary web site. Such a site is hosted by a service provider and is pre-configured to give users easy access to their home or office. This occurs when users log onto the dedicated or shared web site and authenticate themselves, after which, the site gives them access to their home or office. In this way, the user needn't be savvy about the connectivity issues. Furthermore, the user may be presented with the same graphical user interface used in the home or office. Alternatively, the invention allows for direct access and control from a remote place either by the Internet or phone.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

Titles and subtitles used in the text are intended only as focal points and an organization tool. These titles are not intended to specifically describe the applicable discussion or imply any limitation of that discussion.

What is claimed is:

1. A computing system for retrofit installation into a wall, comprising:

a frame having a top side, a bottom side, a right side and a left side, said frame sufficiently rigid to support a load-bearing member of said wall;

a plurality of components comprising a computing assembly, said computer assembly coupled to said frame;

a display device coupled to said frame and having its vertical axis parallel with the vertical access of said wall upon installation;

a cover assembly for detachable installation and for covering artifacts of construction and said computing assembly while allowing visibility to said display device.

2. The invention of claim 1 wherein said computing assembly is integral.

3. The invention of claim 1 wherein said computing assembly is modular.

4. The invention of claim 1 wherein said display device is modular.

5. The invention of claim 1 wherein said cover assembly has an opening for visual and tactile access to said display.

6. The invention of claim 1 where said cover attaches over said computing assembly using a hook and loop connector.

7. The invention of claim 1 wherein said frame has a back side substantially forming a container when combined with said right side, and said left side and said top side, and said right side.

8. The invention of claim 7 wherein said frame has a front side with one or more openings, forming an enclosure that allows visibility to said display.

9. A wall structure comprising:

an aesthetic outer wall and an inner structural support system;

a frame installed in a first cutout of said outer wall and a corresponding second cutout in said structural support system, said frame populated with a computing assembly;

said frame providing structural support in said inner structural support system;

an inflow opening in said frame for allowing air inflow;

an outflow frame opening in said frame for allowing air outflow; and at least one fan to induce airflow in said inflow frame opening and out said outflow frame opening.

10. The invention of claim 9 further comprising;

a first ventilation opening in said wall structure for allowing air inflow and configured with respect to said inflow frame opening so that air entering said first ventilation opening flows to said inflow frame opening;

a second ventilation opening in said wall structure for allowing air outflow and substantially configured with respect to said outflow frame opening so that air exiting said outflow frame opening flows to said second ventilation opening.

11. The invention of claim 10 wherein said first ventilation opening is coupled to said inflow frame opening by a first ventilation shaft; and said second ventilation opening is coupled to said outflow frame opening by a second ventilation shaft.

12. The invention of claim 9, further comprising a cover assembly, said cover assembly having a flared edge to allow for airflow.

13. The invention of claim 9 further comprising a cover assembly, said cover assembly comprising;

a first ventilation opening for allowing air inflow and configured with respect to said inflow frame opening so that air entering said first ventilation opening flows to said inflow frame opening.

14. The invention of claim 13 wherein said cover assembly further comprises a second ventilation opening allowing air outflow and substantially configured with respect to said outflow frame opening so that air exiting said outflow frame opening flows to said second ventilation opening.

15. The invention of claim 9 wherein said frame is rigid enough to provide at least as much support as said second cutout portion of said inner structural support.

16. The invention of claim 13 wherein said cover assembly is at least as large as said first cutout.

17. In a system comprising, a rigid box frame having a integral computing assembly and a display; and a wall having an aesthetic outer surface and an interior structural support system;

a method comprising the steps of:

cutting a hole in said aesthetic outer surface, the size of said hole corresponding to the size of said box frame;

removing portions of the interior structural support system that correspond with said hole; and inserting said box frame in said hole in a manner so as to use said frame to replace the removed portions of said structural support system.

18. The method of claim 16 further comprising the step of covering the computer assembly and the box frame while allowing for visible and tactile contact with said display.

19. The method of claim 16 further comprising the steps of:

installing a vent in said wall;

installing a ventilation shaft coupling said vent to said box frame in a manner that facilitates airflow from said box frame to said vent.

20. The method of claim 16 further comprising the steps of:

applying a cover to said computer assembly and box frame and aligning said cover to allow for air flow through an opening in said cover.

21. The method of claim 16 further comprising the steps of:

applying a cover to said computer assembly and box frame and aligning said cover to allow for air flow around an edge of said cover.

\* \* \* \* \*